April 14, 1959     E. O. LAWRENCE ET AL     2,882,407
CALUTRON

Filed May 14, 1946     2 Sheets-Sheet 1

INVENTOR
ERNEST O. LAWRENCE
WILLIAM M. BROBECK

BY
ATTORNEY

April 14, 1959   E. O. LAWRENCE ET AL   2,882,407
CALUTRON
Filed May 14, 1946                      2 Sheets-Sheet 2

INVENTORS
ERNEST O. LAWRENCE
WILLIAM M. BROBECK
BY
ATTORNEY

United States Patent Office 2,882,407
Patented Apr. 14, 1959

2,882,407

CALUTRON

Ernest O. Lawrence and William M. Brobeck, Berkeley, Calif., assignors to the United States of America as represented by the United States Atomic Energy Commission Application May 14, 1946, Serial No. 669,480

3 Claims. (Cl. 250—41.9)

The invention relates to means especially effective to produce ions and particularly to an ion producing means of the nature referred to as a "calutron." Such a device is disclosed more particularly in the U.S. Patent No. 2,709,222 issued May 24, 1955, to Ernest O. Lawrence. Several forms of calutron are disclosed in the Lawrence patent and the one to which the present invention most closely appertains is especially disclosed in Figures 3 to 5 of that case.

Some ionizing mechanisms, particularly those of the calutron type, generally utilize as a means for producing ions an electric arc struck between a cathode and an anode with the length of the arc substantially parallel to a magnetic field within which the structure operates. The material to be ionized, usually in vapor or gas form, is caused to flow to the vicinity of or through the arc and collisions between the arc electrons and the molecules of the vapor induce the formation of a number of ions that are subsequently withdrawn from the arc or its vicinity by means of a suitable structure such as an accelerating electrode. It is quite important in the production of ions by this means that the gas or vapor be caused to flow in as uniform a fashion as possible in encountering the arc.

It is therefore an object of our invention to provide means for improving the arc structure and its surroundings in a device in the nature of a calutron.

More specifically, it is an object of the present invention to provide for controlled vaporization of a material to be ionized and controlled flow of the vapor to an ionizing zone.

It is a feature of the present invention to provide an ion source comprising three communicating zones or chambers, in the first of which charge material is vaporized, and flows through the second or distributing chamber to the third or arc chamber.

It is a further feature of the present invention to provide an ion source having a distributing chamber connected between a vaporizing chamber and an arc chamber, and means for maintaining said distributing chamber at an elevated temperature with respect to said vaporizing chamber.

Other objects not specifically described above will become apparent as the description proceeds, especially when taken in conjunction with the accompanying drawings, in which.

Figure 1:
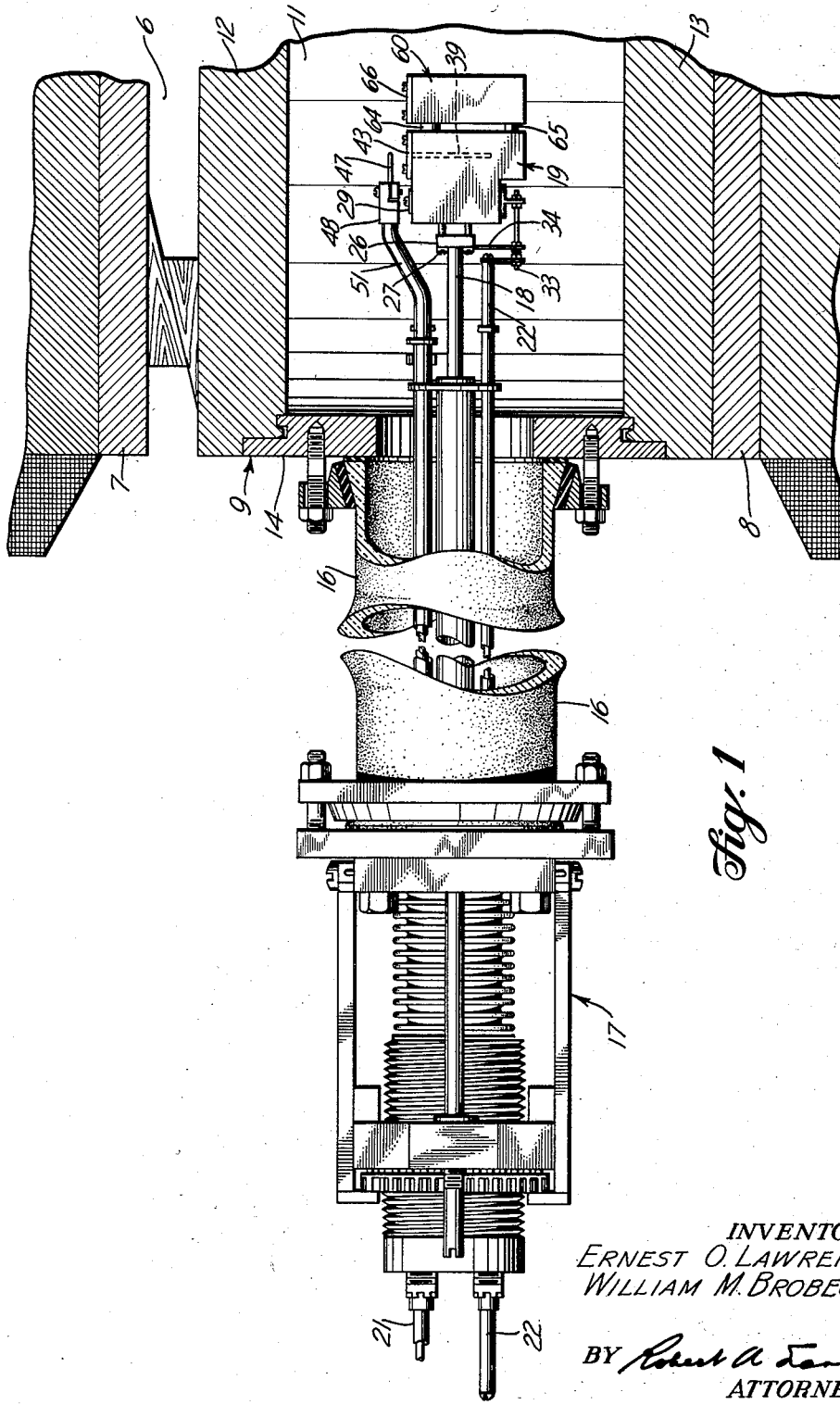
Figure 1 is a fragmentary view of a portion, particularly the source unit, of a calutron, a portion of the figure being disclosed in cross-section on a vertical, median plane and portions of the figure being broken away to reduce its size.

While a calutron is described in considerable detail in the above-identified patent of Lawrence, a brief review of that structure will suffice for an understanding of the present development and is given in connection with Fig. 1.

In a calutron there is provided a volume 6 permeated by a uniform or homogeneous magnetic field established between the upper pole 7 and the lower pole 8 of an electromagnet. Disposed between the poles 7 and 8 and situated within the magnetic field is a tank or vessel 9 enclosing a volume 11 connected to suitable pumping mechanism such as a diffusion pump (not shown) effective normally to evacuate the volume 11 to a pressure of approximately $10^{-4}$ mm. of Hg. The tank 9 includes a top wall 12, a bottom wall 13, and a face plate 14.

Secured removably to the face plate is an insulator 16 serving also as a support for a mounting and adjusting mechanism 17 not described in detail herein as its detailed functioning is not of consequence in connection with the present invention. The structure 17, however, acts as a support for a mounting stem 18 of a source block 19. A number of conductors 21 and leads 22 included in the structure 17 pass with vacuum tightness from the atmosphere into the interior of the vessel 9. The stem 18 is preferably related to the source block 19 by a terminal flange 26 and suitable fastenings 27 so that while some thermal insulation is afforded there is nevertheless good electrical contact.

Figure 3:
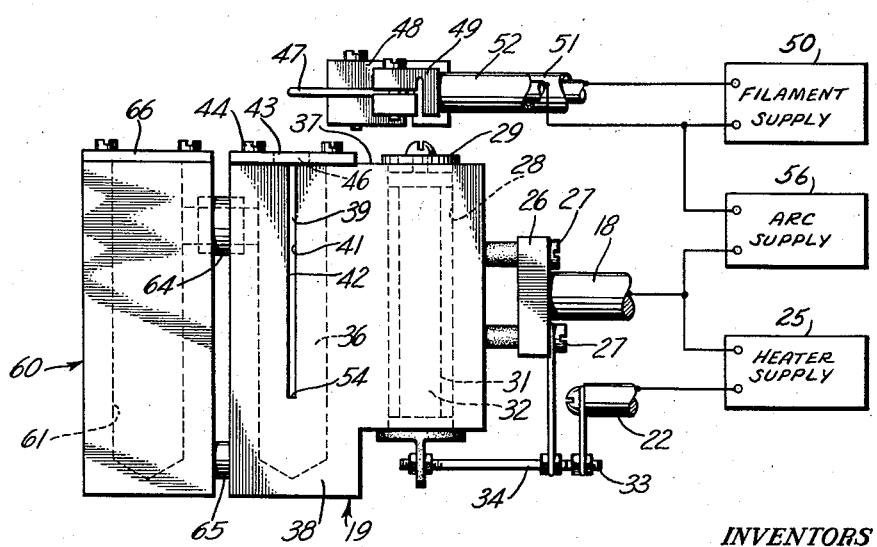
Fig. 3 is a side elevation of the structure shown in Fig. 2.

The source block 19 (Fig. 3) is at its inner end provided with a heater cavity 28 closed by a disk 29 at its upper end and receiving through its lower end an electric coil heater 31 mounted on an insulating core 32. The heater coil is connected to a pair of leads 33 and 34 one being joined to one end of the conductor 22 and the other being connected to the block or flange 26. Upon the imposition of a suitable potential difference by a heater supply 25 between the conductors 18 and 22, the heater 31 is effective to increase the temperature of the block 19. The source block preferably is of metal so that heat from the coil 31 is generally conducted in a uniform fashion to a distributing cavity 36 formed within the block 19. The distributing cavity extends nearly through the under side of the block and entirely through the top face 37 thereof.

Establishing communication between the cavity 36 and the exterior face 38 of the block 19 is a gas passage 39 or arc chamber defined by a pair of parallel planar walls 41 and 42 so that the passage is a straight one extending from within the block to the outside thereof and thus merging not only with the face 38 but also with the adjacent face 37.

To close the cavity 36 and a part of the passage 39 there is provided on the face 37 in abutment therewith, a plate 43 fastened to the block 19 by suitable screws 44 and effective to seal one end of the cavity and one end of the passage. The plate 43 preferably extends beyond the face 38 and overhangs the edge of the block 19. The plate is provided, in registry with the passage 39, with an aperture 46 preferably symmetrically disposed with respect to the passage.

Adjacent the block 19 and overlying the plate 43 is a filament 47 held by grips 48 and 49 at the ends of filament leads 51 and 52 connected to a pair of the conductors 21 so that when a circuit is completed, as by a filament supply 50, the filament 47 is heated to electron emission temperature.

When a correct potential difference is supplied by an arc supply 56 between the filament 47 and the block 19, an arc is struck between the filament and the block. The arc passes through the aperture 46 extends down between the walls 41 and 42 and strikes on the bottom 54 of the passageway 39 which, therefore, serves as an anode.

Figure 2:
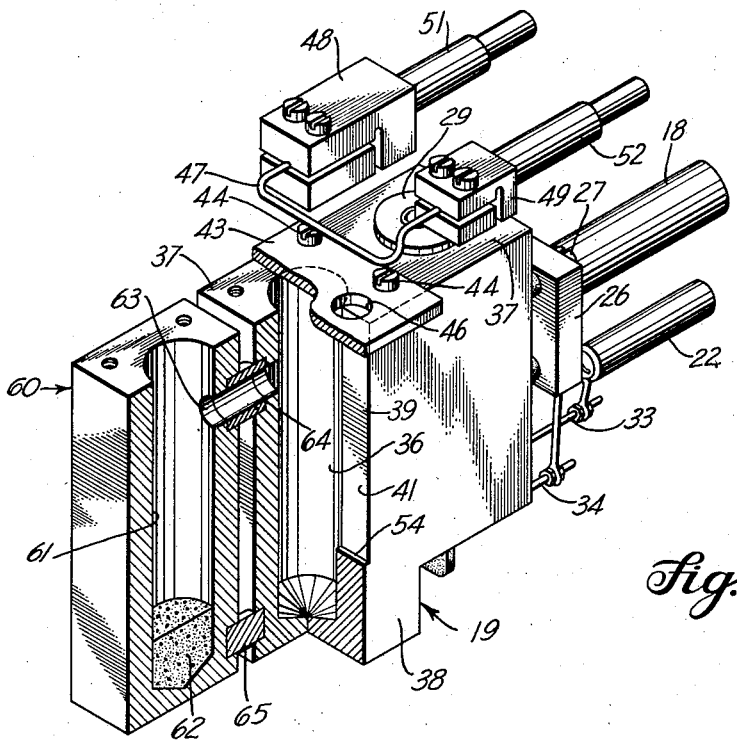
Fig. 2 is an isometric perspective of the source mechanisms and its immediately adjacent structure as illustrated in Fig. 1 but with portions being broken away to disclose the interior arrangement.

In accordance with the present invention, a separate charge receptacle or vapor generator 60 is provided which, as best seen in Fig. 2, comprises a generally rectangular block, which may be formed of copper. Receptacle 60 is provided with a central chamber 61 for receiving charge material 62. A plate 66 overlies and is adapted to close the open upper end of chamber 61.

Charge material 62 is selected such that it may be vaporized by heat, and a passage 63 is provided for vapor to flow from charge chamber 61 to distributing or heating chamber 36. Specifically, a short tubular section or thimble 64 is provided which connects block 60 to block 19 so as to provide for flow of vapor from chamber 61 to chamber 36, and to assist in mechanically supporting block 60 on block 19. Mechanical support of block 60 is further effected by a pin 65 shown as recessed into the adjacent walls of blocks 19 and 60.

It will be readily apparent that conduction of heat from block 19 to block 60 will be materially restricted by the small cross-section of the paths provided by thimble 64 and pin 65. Total heat transfer will be increased by radiation from block 19 to block 60. Elementary considerations will show, however, that in all cases the temperature of block 60 will be somewhat less than that of block 19. This is important since it insures that vapor formed in charge chamber 61 as a result of any temperature therein, will not condense on the walls of distributing chamber 36 or arc or ionizing chamber 39.

Another advantage of the present construction resides in the fact that charge chamber 61 may be substantially filled with charge material 62, without interfering with free and substantially uniform flow of charge vapor from distributing chamber 36 into arc chamber 39 along the entire length of arc chamber 39.

What is claimed is:

1. An apparatus for developing gaseous ions comprising an arc block having an open ended bore extending substantially therethrough, an elongated slot through a wall of said block communicating with said bore and extending from the open ended portion for substantially the length of said bore, a cover plate for said open ended bore having an aperture overlying said slot, heater means included within said block to prevent condensation therein, an electron emissive element disposed in alignment with said aperture and slot, power supply means connected between said element and block for establishing an arc along the length of said slot, and a separate vapor generator supported on a wall of said arc block by means of a mounting pin and a hollow thimble, said thimble communicating with said bore through an aperture in said block whereby vapor generated in said generator flows into said bore and thence uniformly through said slot.

2. An apparatus for developing gaseous ions comprising an arc block having an open ended bore extending substantially therethrough, an elongated slot through a wall of said block communicating with said bore and extending from the open ended portion for substantially the length of said bore, a cover plate for said open ended side of said block and having an aperture overlying said slot, a heating coil disposed in a chambered portion of said block adjacent said bore, electrical means connected to said coil for heating said bore to prevent condensation therein, a cathode disposed in alignment with said aperture and slot, a power supply connected between said cathode and block for establishing an arc along the length of said slot, and a separate vapor generator supported on a wall of said block by at least a hollow thimble, said thimble communicating with said bore through an aperture in said block whereby vapor generated in said generator flows into said bore and thence uniformly through said slot.

3. An apparatus for developing gaseous ions comprising an arc block having an open ended bore extending substantially therethrough, an elongated slot through a wall of said block communicating with said bore and extending from the open ended portion for substantially the length of said bore, a cover plate for said open ended side of said block and having an aperture overlying said slot, a heating coil disposed in a chambered portion of said block adjacent said bore, electrical means connected to said coil for heating said bore to prevent condensation therein, a cathode disposed in alignment with said aperture and slot, a power supply connected between said cathode and block for establishing an arc along the length of said slot, a container for material to be vaporized mounted on and spaced from a wall of said block by at least a hollow thimble, said thimble communicating with said bore through an aperture in said block whereby vapor flows into said bore and thence uniformly through said slot.

References Cited in the file of this patent

UNITED STATES PATENTS 2,221,467     Bleakney _____ Nov. 12, 1940

OTHER REFERENCES

Lamar et al.: Physical Review, Sept. 1, 1935, vol. 48, pp. 886–892.